INVENTOR.
JOHN O. AYERS.
BY
Eugene C. Knoblock,
ATTORNEY.

July 14, 1959 J. O. AYERS 2,894,398
DRIVE MECHANISM
Filed Sept. 10, 1954 2 Sheets-Sheet 2
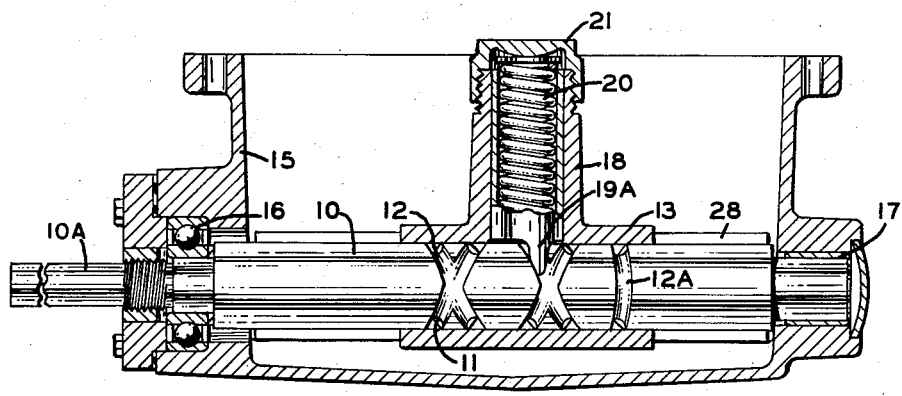
Fig. 3.
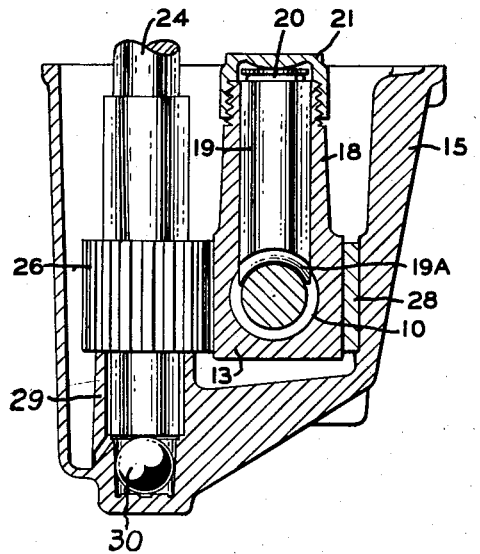
Fig. 4.
Fig. 5.
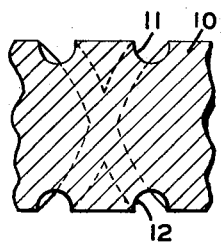
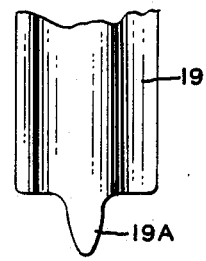
Fig. 6.
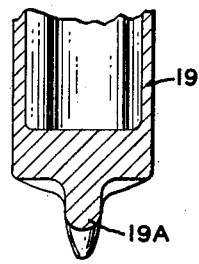
Fig. 7.
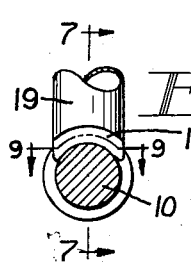
Fig. 8.
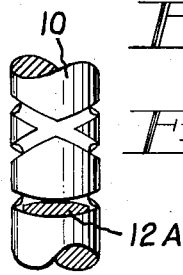
Fig. 9.
INVENTOR.
JOHN O. AYERS.
BY
Eugene C. Knoblock
ATTORNEY.

United States Patent Office 2,894,398
Patented July 14, 1959

2,894,398

DRIVE MECHANISM

John O. Ayers, Cassopolis, Mich., assignor of one-half to David W. Van Story, South Bend, Ind.

Application September 10, 1954, Serial No. 455,170

3 Claims. (Cl. 74—76)

This invention relates to improvements in drive mechanisms of the translatory type, and more particularly to a mechanism utilizing a constantly rotating shaft having two opposed or reversely arranged intersecting helical cam grooves merging to provide one endless groove, and a driven unit having a pawl adapted to engage and follow said cam grooves to translate the rotary motion of the shaft into reciprocating or oscillating movement of said unit.

Mechanisms of this type have many uses, among which are level winding devices on cable drums and fishing reels, windshield wiper drives, and agitator drives for washing machines.

Prior constructions of devices of this type have been subject to disadvantages in uses entailing substantial loads, such as used thereof to drive a rack and pinion for the oscillation of a washing machine agitator. One such disadvantage is that the mechanism is subjected to extreme loading and shock at the points of reversal of movement of the driven unit, and consequently the parts wear out quickly.

Heretofore the cam grooves in the rotating shafts of this type of mechanism have been cut with flat bottoms and straight or tapered sides, with the pawl being shaped to fit accordingly. The surfaces of the cam grooves and pawl require that the pawl be somewhat narrower than the width of the cam grooves so that the pawl may follow the grooves freely and without binding at the merging end portions of the grooves and at points thereof at which the lead of the cam groove changes. Because of this size relation or clearance, there is a tendency under loaded conditions for the pawl to twist or rotate in the groove so that its sharp edges are angularly displaced from normal position in the groove, i.e., with respect to the helix angle of the groove, and have an effect similar to that of a cutting tool and quickly wears out the grooves, particularly at the merging points and points of intersection of the grooves.

Also, in prior mechanisms wherein there is considerable clearance between the sides of the jawl and the sides of the groove, it has been found that a "knocking" or chattering noise occurs upon engagement of the pawl with the merging portions of the grooves at which movement of the pawl slows down from a maximum speed to zero speed and then accelerates to maximum speed in a reverse direction.

It is a primary object of the present invention to provide an improved grooved cam and pawl assembly of the aforementioned type which will be subject to less wear than prior devices of this type, even when subjected to high loading.

It is a further object to provide a mechanism of the character described whose parts will coact in a manner to substantially eliminate twisting or rotation of the pawl with respect to the groove and the frictional forces resulting from said twisting and rotation.

It is a further object to provide a groove and pawl mechanism with an increased bearing surface of pawl and groove to minimize noise.

It is a further object to provide the aforementioned improved mechanism with a minimum of parts and at a minimum cost of manufacture.

The above and other objects and advantages are disclosed by the following more detailed description and by reference to the accompanying drawings showing an illustrative embodiment of the invention, and forming a part hereof and wherein:

Fig. 3 is an axial sectional view of the device shown in Fig. 2 taken substantially along the line 3—3 thereof, and showing the general arrangement of mechanism employing the present invention;

Fig. 4 is a cross-sectional view of the device shown in Fig. 2 taken substantially along the line 4—4 thereof;

Fig. 5 is an enlarged fragmentary sectional view of the rotatable shaft showing the general arrangement and form of the cam grooves which constitute an essential feature of the present invention;

Fig. 6 is an enlarged fragmentary elevation of the pawl member showing the general shape or contour of the leading and trailing edges of the groove-engaging portion thereof;

Fig. 7 is an enlarged fragmentary cross-sectional view of the pawl member taken on line 7—7 of Fig. 8;

Fig. 8 is a fragmentary elevation of the pawl member viewed 90° displaced from the position shown in Fig. 6;

Fig. 9 is a sectional view of the groove-engaging portion of the pawl taken on line 9—9 of Fig. 8.

Figure 1:
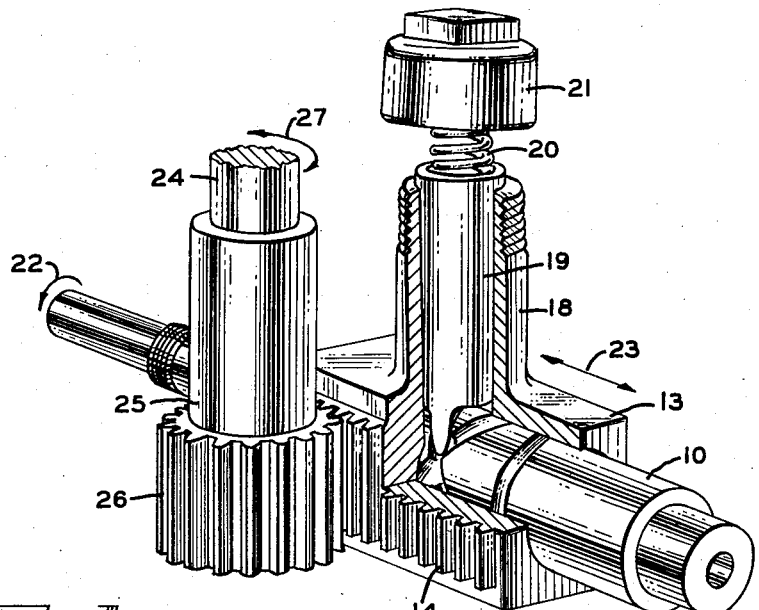
Fig. 1 is a perspective view of one type of mechanical movement embodying the essential features of the present invention with some parts in disassembled relationship and others partly in section to more clearly show the general arrangement.

One embodiment of the present invention is illustrated in the drawings, by way of example, in the form of a device suitable for oscillating a rotatable shaft, such as an agitator shaft of a washing machine. A rotatable shaft 10, adapted for connection with drive means (not shown) for rotating the same, is provided with an endless groove which comprises two opposed or reversely arranged encircling helical cam groove portions 11 and 12 which merge at their ends at 12A and intersect at one or more intermediate points. This endless groove has an axial length along the shaft 10 substantially equal to the desired extent of the reciprocating movement which is to be imparted to a follower member 13 adapted to traverse the 14. The pitch or lead of the groove portions 11 and 12 is preferably the same and may be uniform or may vary along the length thereof, and is determined by the ratio of movement between the rotary member or shaft 10 and the follower member 13 or the rate of deceleration, acceleration and speed of member 13 which is desired at different points of its movement while traversing shaft 10 in each of the two directions of reciprocatory movement.

Suitable means are provided to journal shaft 10. For the embodiment herein illustrated, the shaft 10 is mounted for rotation in a suitable support, such as a casing 15, and is journaled in suitable spaced axially aligned bearings 16 and 17 carried by the support 15. In order to prevent any substantial axial movement of the shaft 10 in the casing 15, the bearings may encircle reduced diameter portions of shaft 10, as shown, and will preferably be bearings capable of taking up end thrust. One end 10A of the shaft will preferably project from the support 15 for connection with driving means, such as an electric motor or other prime mover (not shown).

The follower member 13 preferably comprises an elongated block or tubular member having a bore extending longitudinally thereof and adapted for a snug sliding fit upon the shaft 10 at and adjacent to the groove portion thereof and between the bearings 16 and 17 which are spaced from the end portions 12A of the endless groove as illustrated. A tubular projection 18 is carried by and projects transversely from the member 13 intermediate the length of the member 13. The bore of the tubular projection 18 is substantially uniform and communicates with the bore of the member 13. A cylindrical member 19 has a snug rotative fit in the tubular projection 18 and may have an axial bore therein as illustrated in Figs. 3 and 7 to receive a coil spring 20. A cap 21 is mounted on the outer end of the projection 18, and the coil spring 20 bears thereagainst to urge the member 19 toward and in engagement with the shaft 10. The cylindrical member 19 is provided with a pawl, rib or guide portion 19A projecting from the inner end thereof and adapted to fit in the endless groove and to follow the same as successive portions of the runs 11 and 12 of the groove are presented thereto upon rotation of the shaft 10. Consequently, the interengagement of the follower rib 19A with the shaft groove 11, 12 produces bodily reciprocating or sliding movement of the follower unit 13 and the rack 14 longitudinally along the shaft.

Figure 2:
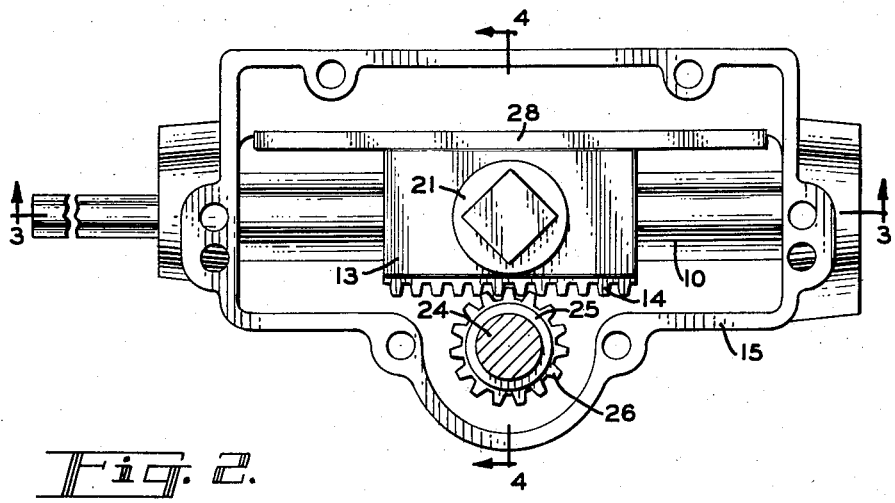
Fig. 2 is a plan view of a gear case housing enclosing the device shown in Fig. 1.

Since the mechanism illustrated is intended for use to oscillate a rotatable shaft 24, said shaft is suitably journaled in the supporting member 10 with its axis parallel to the axis of the cylindrical member 19 in the tubular projection 18 of the follower member as by means of bearing socket 29 and bearing member 30. The hub portion 25 of the pinion 26 is fixedly mounted upon the oscillatable shaft 24 and meshes with the gear teeth 14 formed on the member 13 and constituting a gear rack. In order to insure parallelism of the axes of the parts 18 and 24, guide means are provided upon the support 15 for sliding engagement by the follower unit 13. Guide means are illustrated herein at Figs. 2 and 4 and, in the form shown, constitute a plate or block 28 having slidable surface engagement with a surface of the part 13 throughout the full length of the stroke of the member 13, for which purpose the guide member 28 is made of a length longer than the member 13, as best illustrated in Fig. 2.

The shape of the grooves 11 and 12 and of the groove following lip 19A are of primary concern in this invention. Fig. 5, an enlarged cross-section through a portion of the shaft, illustrates the cross-sectional shape or contour of the grooves 11 and 12 and the curvature thereof. As illustrated in Fig. 5, the base or bottom of each of the grooves 11 and 12 is curved and merges with the side walls of the groove so that each groove is substantially of arcuate or part-circular or part-elliptical cross-sectional configuration.

Figs. 6, 7, 8 and 9 illustrate the shape of the groove-following rib 19A which extends diametrically relative to the cylindrical member 19 from whose end it projects. As best seen in Figs. 4 and 8, the groove-following rib 19A is substantially arcuate in side elevation so as to fit in the endless groove of the shaft throughout its full length. The cross-sectional shape of the rib 19A at the central portion thereof is shown at Fig. 7 and substantially conforms with the cross-sectional shape of the grooves 11 and 12 so as to have a snug sliding fit therein. The opposite end portions of the groove follower 19A taper from the intermediate portion thereof toward its ends, as best illustrated in Fig. 9, so that the tips thereof are narrower than the intermediate portion and present the configuration best seen in Figs. 6 and 7. As a result of this arrangement, the intermediate portion of the groove follower 19A substantially spans the groove of the shaft in which it is located, while its tips are subject to slight lateral clearance. This lateral clearance accommodates variations in the pitch or lead of the groove as such occurs, and also accommodates rotation of the member 19 without chatter when the end portions 12A of the grooves are traversed. In this connection it will be observed in Fig. 9 that the tapered tips of the lip 19A at both its forward and trailing ends contact the side walls of the portion 12A of the groove or thread of shaft 10, thereby providing substantial rotational stability and positively insuring against free play or chatter of the lip 19A at this point.

Inasmuch as the operation of the device entails reciprocation of the member 13 incident to rotation of the shaft 10 and the transmission of the translatory movement between those parts through the lip 19A, it is evident that maximum stresses are applied to the lip 19A at each end of the reciprocatory stroke of the member 13 incident to deceleration and reacceleration thereof. Also, rotation of the member 19 and swinging of the cross lip 19A relative to the axis of the member 19 occurs at each end of the thread or groove at the curved portion 12A. The combined action of deceleration and reacceleration, together with rotation and swinging of the member 19A, introduce great shock and load to the member 19A at groove portions 12A, so that fore and aft engagement of one side of the rib 19A, as illustrated in Fig. 9, positively controls the rotation and reversal or swinging of lip 19A and thus avoids chatter, knocking and other deleterious action which commonly characterize drive-translating devices of this character at the point of reversal.

Tapering of the tips or fore and aft ends of the groove follower rib 19A is also advantageous in guiding said lip across intersections of the groove. Obviously, the reduced width of the lip at its leading end results in spacing of said tips from the side walls of the groove and from the sharp corners and edges defined at the points of intersection of grooves. Consequently, the tip or leading end of each guide lip 19A crosses or passes the groove intersection before the wider intermediate portion of the lip comes in contact with the groove adjacent the groove intersection. This arrangement can be likened to a camming action and insures against interference by the groove intersections with the action of the groove follower as frequently occurs in drive-translating devices of this type of conventional construction.

Still another factor which leads to reduction in friction, reduction in load and reduction in wear of this construction as compared to prior conventional drive-translating mechanism, is the cross-sectional shape of the guide rib 19A and the grooves 11 and 12. Specifically, the curvature of the bottom of each groove which merges with the side walls of the groove, and the complementary curvature of the crest of the guide rib 19A at its intermediate portion, together with the cross-sectional curvature of the crest of the end portions or tips of the guide ribs 19A, insure that interengagement of the substantially complementary surfaces of the rib and the groove will be limited to substantially face engagement as opposed to engagement of a sharp edge or corner of the lip with a wall of the groove. Consequently, no tendency for cutting, scratching or gouging action by the lip with respect to the groove or thread of the shaft can occur, and long life and substantially free operation are assured. Also, noise of operation is reduced to a minimum, and substantially complete elimination of the noise at the crossing of groove intersections, as has been commonly experienced in prior devices of this type, can be secured.

The length of the guide lip 19A must be greater than the width of the grooves 11 and 12 and, as here shown, as in Fig. 4, is greater than the diameter of the shaft 10 at the roots of the cam grooves 11 and 12. Also, as shown in Fig. 4, the concave curvature of the outermost edge of the guide lip 19A substantially conforms with the curvature of the grooves 11 and 12 about the axis of the shaft 10. These dimensions insure a large bearing surface for engagement between the lip 19A and the grooves 11 and 12 in all positions of the grooves so as to avoid localization of stresses transmitted between the shaft 10 and the guide lip 19A and thereby avoid possibility of breakage of the lip 19A. It will be understood that the contour or shape of the member 19A will be controlled by the requirements of the construction of the other parts of the device and particularly by such factors as the width and depth of the cam grooves 11 and 12, the diameter of the follower member 19, the diameter of the shaft 10, and the lead or helix angle of the cam grooves. In each instance the design will be such that the guide portion or lip 19A fits closely within the cam grooves 11 and 12 at its mid portion so as to slide freely lengthwise therein without play.

In the preferred form the depth of the guide lip 19A is greater than the depth of the cam grooves 11 and 12. Consequently, should any wear occur between these parts as under excessive loading conditions, the bias of the spring 20 will compensate therefor in addition to the function of the spring to absorb the shock which takes place at the points 12A of reversal joining the two cam groove portions 11 and 12.

It will be understood that, while the device has been illustrated as one in which the part 13 is reciprocatory and the shaft 10 is restrained against longitudinal displacement, the device can be constructed with the parts in reverse relation. Thus by simply providing for a splined drive connection between shaft 10 and a prime mover, the shaft can be permitted to reciprocate endwise as it rotates, and member 19 can be mounted with its axis in a fixed position. In this form the device to be driven, such as shaft 27, may be connected to or actuated by either the part 19' or the shaft 10.

While the present invention has been described with reference to one embodiment thereof, it is not intended that it be limited to that particular embodiment nor otherwise than by the terms of the appended claims.

I claim:

1. In a drive translating device of the class described, a rotatable cylinder having an endless groove thereon constituted by two reversely directed intersecting helical groove portions connected at their ends and having a curved and substantially uniform cross-sectional shape throughout, a member slidable longitudinally of said cylinder, a groove follower rotatably carried by said member, and an arcuate elongated guide portion projecting from said follower member and seating in said groove to substantially uniform depth throughout its length, said guide portion having a central portion of curved cross-section substantially complementary to the cross-sectional shape of said groove and a longitudinally tapered and curved shape for close fitting slidable relationship with said groove, said guide portion being longitudinally tapered from said central portion to its ends to provide reduced width end portions of curved cross-section and longitudinally curved sides on said guide portion whereby rotation of said cylinder causes traversal of said groove by said guide portion uniformly and substantially non-rotatively along each groove portion and at the points of intersection of said groove portions and whereby rotation of said follower in said member is limited to that caused by changes in the pitch of said helical groove portions.

2. In a drive translating device having a rotatable cylinder having an endless thread thereon constituted by two reversely directed intersecting helical grooves joined at their ends, a reciprocating member slidable on said cylinder, and a follower element rotatably carried by said reciprocating member and having a guide rib seating in said thread, the improvement consisting of a uniform groove cross-sectional form characterized by a curved bottom portion, and a guide rib form characterized by an elongated arcuate contour and a mid portion of curved cross-sectional shape for close fitting sliding relationship with said thread, said rib projecting into said thread uniformly throughout its length, whereby rotation of said cylinder effects reciprocation of said reciprocating member thereon under the control of said follower rib and thread, the free groove-received marginal portion of said rib tapering progressively from its mid portion toward its ends and also tapering transversely of its length and the tips of said rib being arcuate transversely at all points along their length whereby to substantially eliminate relative angular movement between said guide rib and said thread.

3. In a drive-translating device of the type comprising a rotatable shaft having an endless groove of curved cross-section formed of opposed intersecting helical portions connected at their ends, a groove follower rotatable on an axis substantially perpendicular relative to the shaft, and means mounting said shaft and follower to accommodate bodily reciprocation of one relative to the other in a path parallel to the axis of said shaft, the improvement consisting of an elongated groove-engaging pawl extending transversely of the axis of said follower and curved longitudinally to penetrate said groove substantially uniformly throughout its length, the intermediate portion of said pawl being transversely curved and fitting snugly and slidably in said groove, and the opposite end portions thereof tapering in width to define longitudinally curved camming sides thereon substantially conforming with the longitudinal curvature of the sides of the groove at the connection of the helical portions thereof.

References Cited in the file of this patent

UNITED STATES PATENTS

| | | |
|---|---|---|
| 267,793 | Kieferle | Nov. 2, 1882 |
| 1,177,428 | Melin | Mar. 28, 1916 |
| 2,002,657 | Correll | May 28, 1935 |
| 2,216,990 | Taylor | Oct. 8, 1940 |
| 2,441,596 | Reitter | May 18, 1948 |
| 2,503,158 | Lane | Apr. 4, 1950 |
| 2,539,921 | Neisingh | Jan. 30, 1951 |
| 2,705,592 | Reiser | Apr. 5, 1955 |